Aug. 8, 1950 W. A. TEN EYCK 2,517,942
VEGETABLE BLANCHING APPARATUS
Filed June 6, 1944 2 Sheets-Sheet 1

Inventor
Wm A. Ten Eyck

Attorneys

Aug. 8, 1950 W. A. TEN EYCK 2,517,942
VEGETABLE BLANCHING APPARATUS
Filed June 6, 1944 2 Sheets-Sheet 2
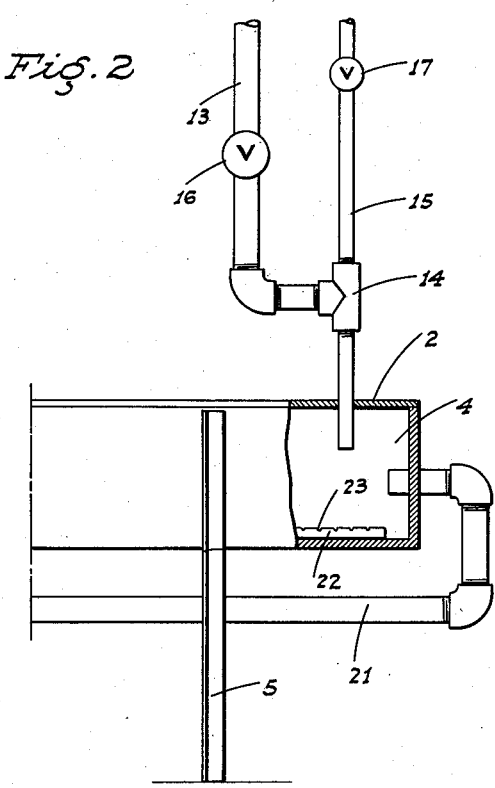
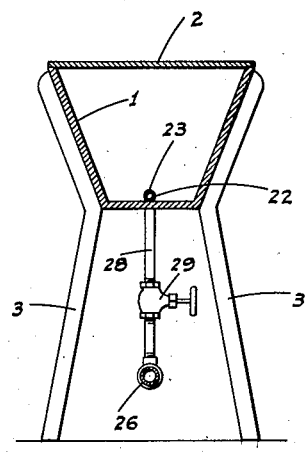
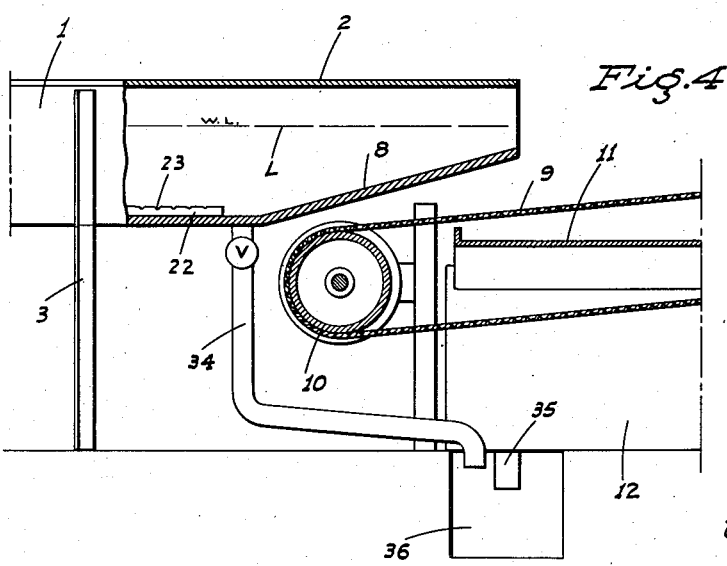
Inventor
Wm A. TenEyck
By Webster & Webster
Attorneys Patented Aug. 8, 1950

2,517,942

UNITED STATES PATENT OFFICE 2,517,942

VEGETABLE BLANCHING APPARATUS

William A. Ten Eyck, Sacramento, Calif., assignor to Bercut-Richards Packing Company, Sacramento, Calif., a corporation of California Application June 6, 1944, Serial No. 538,891

1 Claim. (Cl. 134—108)

This invention is directed to, and it is an object to provide, improvements in blanching apparatus for vegetables, particularly asparagus, preparatory to canning or otherwise processing the same; such apparatus being operative to simultaneously and continuously convey, blanch, and wash the vegetables being processed.

A further object of this invention is to provide an improved vegetable blanching apparatus which includes an elongated flume through which a stream of steam-heated water continually flows at a predetermined and controlled temperature, as well as at a regulated velocity; the vegetables to be blanched being introduced into the trough at one end, thence moving with the flowing stream of heated water therein to the other end of the trough, and finally being removed from the trough at said other end for further processing; the velocity of the stream and its temperature being correlated so that the vegetables are properly blanched upon their arrival at the point of removal from the trough.

An additional object of this invention is to heat the water in the trough throughout the length of the latter; such heating means comprising steam pipes in the bottom of the trough; said pipes having steam escape orifices therein whereby escaping steam not only heats the stream of water but also agitates it, whereby the turbulence causes more uniform blanching together with a washing of the vegetables floating in said stream.

It is also an object of the instant invention to provide a method of blanching vegetables which comprises the steps of establishing a stream of flowing, heated water, maintaining said stream at a predetermined temperature and velocity, introducing vegetables into the stream at a point adjacent its head end, removing the vegetables from the stream at another and spaced point, and agitating the stream between said points; the distance between said points being such that the time required for the vegetables in said flowing stream to reach the point of removal is predetermined to be the time necessary to accomplish proper blanching of the vegetables.

A further object of the invention is to provide a simple and inexpensive vegetable blanching method and apparatus, and yet one which will be exceedingly effective for the purpose for which it is designed.

These objects I accomplish by means of such structure and relative arrangement of parts as will fully appear by a perusal of the following specification and claim.

In the drawings similar characters or reference indicate corresponding parts in the several views:

Figure 2 is an enlarged fragmentary sectional elevation on line 2—2 of Fig. 1, illustrating the head end of the trough together with the water supply and water return pipes.

Figure 3 is an enlarged cross section on line 3—3 of Fig. 1, illustrating the shape of the trough and the position of the steam pipe therein.

Figure 4 is an enlarged, fragmentary sectional elevation on line 4—4 of Fig. 1, illustrating the discharge end of the trough and related parts.

Figure 1:
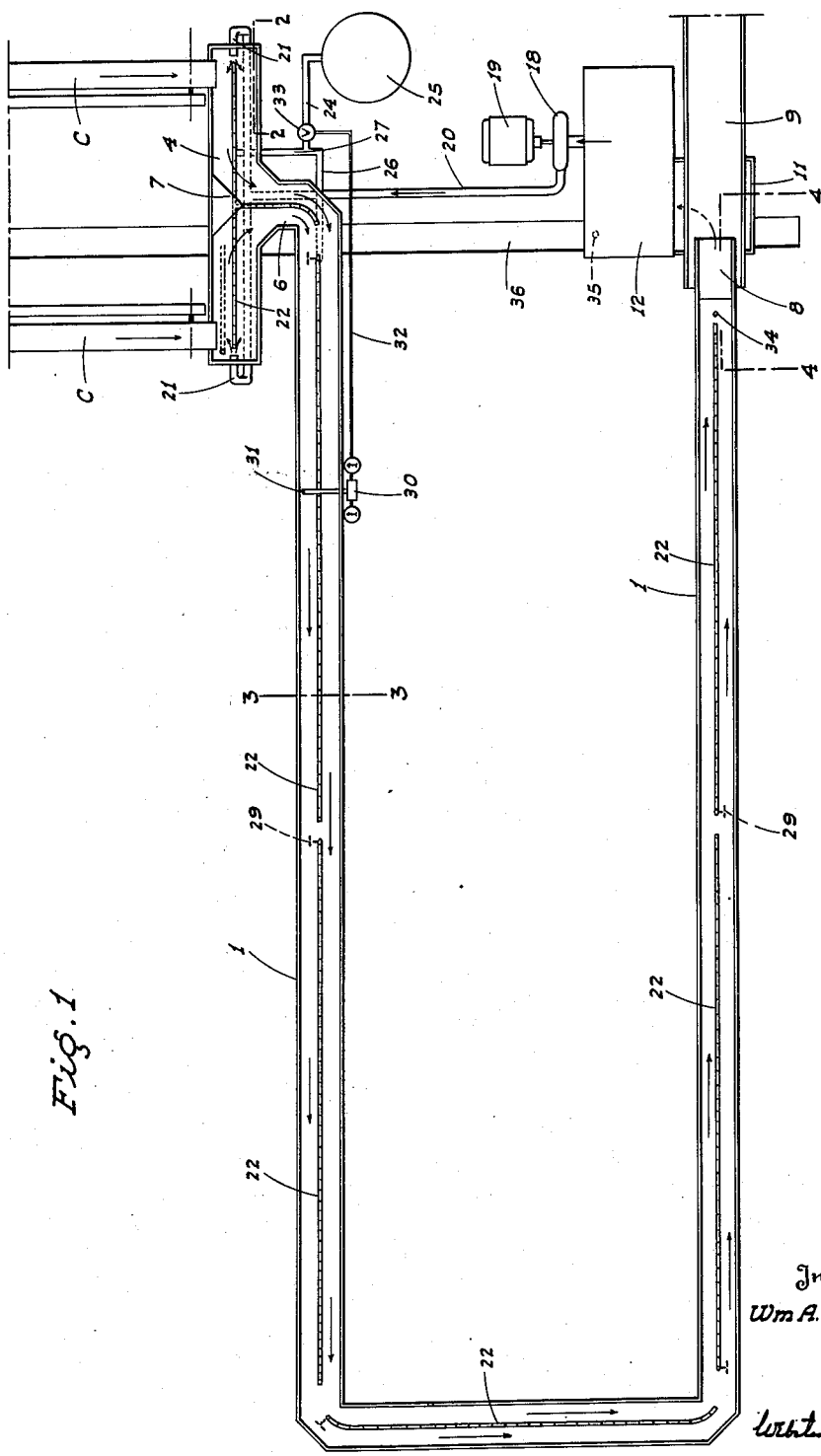
Figure 1 is a plan view, mainly diagrammatic, of the apparatus embodying the present invention; the trough covers being removed.

Referring now more particularly to the characters of reference on the drawings, the apparatus comprises a horizontally disposed, elongated trough 1, preferably of U-shape in order to reduce the floor space required for such apparatus. The trough 1 is of tapered configuration in cross section, with the sidewalls extending in upward and outwardly diverging relation, as clearly shown in Fig. 3. The trough 1 is normally closed from end to end by means of removable top covers 2; and such trough is supported from the floor at spaced points by means of legs 3.

A relatively short, horizontally disposed receiving trough 4 is supported by legs 5 adjacent and parallel to one end portion of the trough 1 on the outside of the latter. The receiving trough 4 is connected centrally of its ends and on the side near the trough 1 with the adjacent end of the latter by means of a lateral or connecting trough 6. An upstanding deflector plate 7 extends across the receiving trough 4 centrally of its ends and into the lateral trough 6 in symmetrical relation to and between the sides of the latter.

A pair of endless driven conveyors C of conventional construction are mounted substantially horizontal and for discharge into the receiving trough 4 from above the same and adjacent opposite ends thereof; the conveyors C in the present embodiment serving as sorting and grading tables.

The end of the trough 1 which connects with the lateral trough 6 is the head end of said trough, while the opposite end is the discharge; said discharge end portion of the trough being formed with an upwardly inclined bottom portion 8, as clearly shown in Fig. 4; such forwardly inclined bottom portion of the trough serving to establish and maintain the water level L in said trough, as will hereinafter appear.

The discharge end of trough 1 overhangs the upper run of an endless, longitudinally extending carry-off conveyor 9 driven with said upper run moving in a direction away from the trough 1; such driven carry-off conveyor being supported at its ends by drums, one of which is shown at 10. The conveyor 9 is perforate to permit the passage of water therethrough, and a catch pan 11 is disposed between the upper and lower runs of said conveyor below the discharge end of trough 1; said catch pan being disposed laterally at an incline and arranged to discharge into a water tank 12.

The trough 1, together with the receiving trough 4, is initially filled with hot water to the water line L by means of a depending water feed pipe 13 disposed to discharge into the receiving trough 4 adjacent one end thereof; the water from said feed pipe being heated, as it flows toward the trough 4, by means of steam injected through a mixing fitting 14 from a steam pipe 15; the pipes 13 and 15 including flow control valves 16 and 17 therein, respectively. The valves 16 and 17 are set, after the troughs 1 and 4, together with the tank 12, have been filled with water, so as to admit only sufficient additional water to compensate for operating loss.

The flow of water from receiving trough 4 through trough 1, in the direction indicated by the arrows, is maintained, and at predetermined velocity, by means of a pump 18 driven by a variable speed motor 19; the pump 18 drawing water from the tank 12 and delivering such water through a return pipe 20, which includes branches or laterals 21 which discharge into the receiving trough 4 at opposite ends thereof. It will thus be seen that by means of this arrangement the water in the apparatus is constantly recirculated and that by regulating the output of pump 18 the flow velocity in trough 1 can be effectively controlled. As the water escapes from the discharge end of the trough 1 over the lip of the upwardly inclined bottom portion 8, it falls through the upper run of conveyor 9 onto the catch pan 11 and thence is returned to tank 12.

The circulating water in the trough 1, as well as in the trough 4, is maintained at a predetermined and constant heat by means of the following arrangement:

In the bottom of trough 1 throughout its length and in receiving trough 4 are steam pipes 22 which are formed, along the length thereof, with a multiplicity of steam escape perforations or ports 23 of relatively small diameter. Steam is fed to the pipes 22 by means of a supply pipe 24 which leads from a boiler 25; the pipe 24 being branched with one branch 26 leading beneath the trough 1 and the other branch 27 leading beneath the trough 4. Laterals 28, including hand valves 29, connect the branches 26 and 27 with the corresponding steam pipes 22 in the respective troughs.

The flow of steam through pipe 24 into branches 26 and 27, and consequently into steam pipes 22 is automatically regulated by means of a temperature gauge and thermostatic control unit 30 which includes a heat responsive member 31 projecting into the trough 1, and a control conduit 32 which leads to a valve 33 in supply pipe 24. The unit 30 is set so as to admit sufficient steam into the pipes 22 to maintain a predetermined temperature of the water in the troughs.

When the apparatus is in use asparagus or other vegetables are discharged from the endless conveyors C into the receiving trough 4, from whence they flow with the stream of water introduced by the branches 21 of pipe 20, into the trough 1. The vegetables then traverse the entire length of said trough 1, being carried along by the heated stream of water therein. The temperature of the water and its velocity are regulated so that by the time the vegetables reach the discharge end of trough 1 said vegetables have been blanched to the extent desired. The steam injected into the stream of water in the trough 1 from the perforations 23 in pipes 22 not only maintains said stream at the desired temperature, but causes an agitation or turbulence. This turbulence is advantageous for the reason that it not only produces movement of the vegetables and consequently more effective blanching, but also results in a desirable washing or cleaning of the vegetables.

When the blanched vegetables reach the discharge end of trough 1 they flow over the lip of the inclined bottom portion 8 and fall onto the upper run of the perforate carry-off conveyor 9 for further grading and processing. The water flow from said discharge end of the trough falls through said upper run of conveyor 9, as previously explained, and is returned by the catch pan 11 to the hot water tank 12.

With the above described apparatus and method of blanching vegetables a uniform result can be obtained, and as the process is continuous it is well adapted to uninterrupted handling operations.

The troughs, as well as the tank 12, can be drained when desired by means of drain pipes 34 and 35 which discharge into a gutter 36 in the floor.

A steam ejector may be used in connection with the return tank in lieu of the water pump as a means of further regulating the flow of water, and controlling the temperature thereof. This would eliminate any possibility of a shutdown due to failure of the pump.

From the foregoing description it will be readily seen that I have produced such a vegetable blanching method and apparatus as substantially fulfills the objects of the invention as set forth herein.

While this specification sets forth in detail the present and preferred construction of the method and apparatus, still in practice such deviations from such detail may be resorted to as do not form a departure from the spirit of the invention, as defined by the appended claim.

Having thus described my invention, what I claim as new and useful and desire to secure by Letters Patent is:

Vegetable blanching apparatus comprising an elongated trough, said trough being closed at its head end and formed with a spillway at its discharge end, a water circulating system arranged to establish and maintain a stream of flowing water in the trough, said system including means to catch the stream below said spillway, means to heat the stream of water, means to introduce vegetables into the stream adjacent the head end of the trough, and means to remove the vegetables from the stream adjacent said spillway; said vegetable introducing means comprising a separate receiving trough disposed adjacent the head end of said elongated trough, a connecting trough disposed between the ends of said receiving trough leading to and communicating with the elongated trough, the stream originating part in one end and part in the other end of the receiving trough, means in the latter to deflect said parts of the stream into the connecting trough, and means to deposit vegetables in said receiving trough on opposite sides of said connecting trough.

WILLIAM A. TEN EYCK.

REFERENCES CITED

The following references are of record in the file of this patent:

UNITED STATES PATENTS

| Number | Name | Date |
| --- | --- | --- |
| 1,047,639 | Hunt et al. | Dec. 17, 1912 |
| 1,559,733 | Barger et al. | Nov. 3, 1925 |
| 1,724,639 | Burch et al. | Aug. 13, 1929 |
| 1,732,180 | Brogden | Oct. 15, 1929 |
| 1,871,507 | Gardner | Aug. 16, 1932 |
| 2,092,499 | Carpenter | Sept. 7, 1937 |
| 2,162,415 | Allen | June 13, 1939 |
| 2,249,792 | Skinner | July 22, 1941 |
| 2,299,080 | De Back | Oct. 20, 1942 |